3,069,277
AQUEOUS DISPERSIONS OF HIGH MOLECULAR WEIGHT FIBRILS OF AMORPHOUS SILICATES
Jayanti Dharma Teja, Syosset, N.Y., assignor to Montecatini-Societa Generale per l'Industria Mineraria e Chimica, Milan, Italy, a corporation of Italy
No Drawing. Filed Dec. 18, 1959, Ser. No. 860,321
2 Claims. (Cl. 106—74)

This invention relates to the preparation of aqueous solutions of polymeric silicates.

This application is a continuation-in-part of my copending application Series No. 655,166, filed April 26, 1957, now U.S. Patent 2,919,996, assigned to the assignee of the present application.

Heretofore it has been known that monomeric silicic acid could undergo condensation in aqueous acid to form generally spherical colloidal particles of polysilicic acid. Textbooks such as "The Colloidal Chemistry of Silica and Silicates" by R. Iler (Cornell V.P., 1955), "Physical Chemistry of Silicates" by Eitel (U. Chicago Press, 1952) "Light-Scattering in Physical Chemistry" by Stacey (Butterworth, 1956) "Silicic Science" by Hauser (Van Nostrand, 1955) and "Soluble Silicates" by G. G. Vail (Reinhold, 1952) each described data indicating that acidic and neutral aqueous suspensions of polymeric silica consist of globular siliceous particles. The sodium silicates, potassium silicates and mixtures thereof are known as the akaline silicates, and share together a variety of properties with which silicate chemists are familiar. Although the pH of an aqueous system might be above 7, and hence alkaline, and although such a system might contain dispersions of insoluble siliceous minerals, such a system would not be an alkaline silicate system, because such term embraces only materials closely related to water glass. Although the possibility of linear polymerization of alkaline silicates has been recognized it has been believed that only moderate molecular weights were attainable, and that even these colloidal particles were globular instead of linear. Previous workers have described globular particles of 10,000 molecular weight in commercial alkaline silicate solutions but the average molecular weights of such silicate solutions have generally been less than 2000.

In accordance with the present invention aqueous systems containing linear polysilicates either having an average molecular weight greater than about 5,000 or containing significant amounts of colloidal particles having a molecular weight greater than 20,000 are prepared by the application of, and control of, the catalysts and polymerization conditions effective for achieving such linear (as distinguished from globular) polymerization.

One of the possible theories for explaining the beneficial results of the present invention is that specific distortion of the linear polysilicate unit favors the linear (as distinguished from globular) structure of silicate particles undergoing polymerization. By bringing about the polymerization of silicates in an alkaline aqueous system in the presence of appropriate catalysts, linear fibrils of polysilicate are formed. Some data relating to asbestos, endellite and other naturally-occurring siliceous materials possessing linearity, can be interpreted consistently with such theory.

This discovery that aqueous systems containing colloidal fibrils of linear polysilicate can be prepared clarifies the explanation of the methods of preparing glass fibers from aqueous systems as set forth in the applications of J. D. Teja, Serial No. 511,132 filed May 25, 1955 (entitled Preparation of Mineral Fibers) now U.S. Patent 2,908,545 and Serial No. 526,779, filed August 5, 1955 (entitled Manufacturing Glass Fibers), now abandoned. This application is a continuation-in-part of said applications. The aqueous systems containing colloidal fibrils of linear polysilicate are believed to have usefulness in the protective coating, adhesives, and other arts apart from their usefulness in preparing glass fibers. As explained in ancestor applications, Serial Nos. 511,132 and 526,779, molybdena is not in the group of glass forming oxides recommended by glass technologists for glass-making. Said Serial No. 526,779 explains that it is sometimes preferable to select glass-forming oxides from the group consisting of boria, alumina, zirconia, titania, zinc oxide, calcium oxide, barium oxide, arsenic oxide, germania, hafnia, phosphoric oxide, vanadia, antimonia, lead oxide, thoria, berryllia, and tungstic oxide. In the glass making technology, the term "metal oxide" sometimes includes oxides of elements which some chemists would not designate as metals. Although the present invention is concerned with aqueous alkaline silicates, the terminology and classifications have been taken in part from some of the older classical textbooks on glass technology.

The technical subject matter pertinent to the present invention can be better understood by a consideration of a series of sets of data, which are for convenience designated as examples.

Because the prior art literature concerning aqueous compositions of compounds of silicon connotes that the larger particles resulting from polymerization in water are consistently of a globular structure, the persuasiveness of the evidence in support of the linear structure of the products of the present invention should be understood even before detailed consideration is given to the methods by which such products are prepared.

Colloidal polysilicic acid solutions in water have been studied by light scattering techniques to measure both the turbidity molecular weights and the values of dissymmetry (Z).

Consideration can be given to publications such as Naumann and Debye, J. Phys. Chem., 55, 1–8 (1951), Iler et al., J. Phys. Chem. 57, 932 (1953) and Edsall, J.A.C.S. 75, 5058 (1953).

The values covering the whole range of turbidity molecular weights and values of dissymmetry are shown in Table 1. It is to be noted that a (Z) value approaching 1.1 is necessary to estimate the value of a spherical particle as equivalent to approximately Angstroms. Dissymmetry (Z) values of 1.1 are extremely unreliable in terms of the accuracy of the method of determining (Z), because a value of 1.1 may merely indicate that (Z) is very nearly equal to 1.

TABLE 1

*Turbidity Mol. Weights and (Z) Values for Colloidal Silica*

| Turbidity mol. weight in millions | Particle diameter in Angstroms | (Z) value |
|---|---|---|
| 3.8 | 175 | Approximately 1. |
| 8.3 | 230 | Approximately 1. |
| 19.5 | 300 | Approximately 1. |
| 54.0 | 430 | Approximately 1.1. |
| 100.0 | 530 | Approximately 1.1. |
| 210.0 | 660 | Approximately 1.15. |

In most light scattering work, carefully filtered solutions are employed. Such filtration of colloidal silica solutions provides data on particles having molecular weights in the range of approximately 4 million and a particle size less than 200 A. and a (Z) value equal to 1. The date on the 210,000,000 molecular weight 660 A. diameter particles of colloidal silica were obtained using solutions purified, not by filtration, but by centrifuging techniques.

Both the prior art literature and the experimental work during the development of the present invention confirmed the absence of dissymmetry and the existence of the globular shape of the particles in a colloidal silica solution. Colloidal silica solutions are generally prepared under slightly acidic conditions, but after being prepared may be converted to alkaline aqueous systems containing such globular colloidal particles. In evaluating light scattering data, consideration must be given to the effects of various amounts of ions in the system being investigated.

Polyelectrolytes in ionizing solvents behave differently from non-electrolyte systems. In tests upon polyacrylic acid, the conversion of the material to a polyelectrolyte resulted in a reduction of the intensity of the 90° light scattering to about 2% of the intensity with the nonionized material. Under some conditions, there can be the anomalous observation of (Z) values less than 1.

Thus the molecular weight determinations of polyelectrolytes by turbidity methods can lead to apparent molecular weight determinations which are smaller than the real value. However, reliable measurements can be made by the turbidity methods in systems of high ionic strength.

The linear polysilicate systems of the present invention provide the high ionic strength necessary, and reliable, consistent data are obtained.

Aqueous solutions of sodium silicate have previously been studied by light scattering methods, as described for example in the previously cited Naumann and Debye article. They worked with pure sodium silicates and obtained generally only stoichiometric molecular weights e.g. approximately 76.1 for the ion $SiO_3$. Only in very dilute solutions of less than 0.05 gm./cc. concentration of aged commercial tetrasilicate $Na_2O:SiO_2::1:3.9$ they found molecular weights up to 10,000. At higher concentrations above 0.1 mg./cc., silicates more alkaline than $Na_2O; 2.0\ SiO_2$ have turbidities similar to sucrose. They detected no evidence of polymerization. The more siliceous solutions as stated above in course of ageing develop larger particle sizes with molecular weights approaching 10,000. In all these cases studied (Z) values were not expressed because they are almost equal to 1.

Thus, prior art literature shows particles of sodium silicate having a molecular weight as high as 10,000, in alkaline solution have a globular shope. Such prior art findings are to be contrasted with the surprising results obtained by the present invention.

Aqueous solutions prepared in accordance with the present invention were studied by light scattering methods, which proved that these solution contained colloidal silicate particles of very high molecular weight and possessed such high (Z) values as to necessitate the conclusion that the polymeric silicate was linear instead of globular. These data are shown in Table 2.

TABLE 2

| Turbidity mol. weights: | (Z) values |
| --- | --- |
| 10,000 | 1.3 |
| 33,000 | 1.65 |
| 100,000 | 2.8 |
| 350,000 | 4.7 |
| 800,000 | 5.2 |

For a spherical silicate particle in the system $Na_2O:3.75\ SiO_2$ a density of 0.43 was estimated (Vail and Will, vol. 1, page 100).

The diameter of such a particle of molecular weight 800,000 cannot be more than 530 Angstroms by comparison with colloidal silica particles of density 2.2 and molecular weight $100 \times 10^6$ and diameter 530 Angstroms. The (Z) value for an aqueous system of such particles should be approximately 1.1 and not as large as 5.2. Such a high value for (Z) can only mean extended molecules linear in nature, especially in view of the evaluation of a polyelectrolyte system of high ionic strength. Using the value of approximately 4 Angstroms for the size of $Si(OH)_4$ unit in the systems, one obtains correlation with observed (Z) values and hence particle sizes if one theorises a rod particle of a small cross-section containing, on the average, 4 or more silicon tetrahedra linked together in the width and depth directions and hundreds of silicon tetrahedra joined in the length direction.

Accordingly, it is necessary to postulate fibrillar molecules in the polysilicate systems prepared in accordance with the present invention.

Alkaline silicate material is converted to an aqueous system containing linear polymeric silicate by partially dehydrating the aqueous system in the presence of an appropriate, expendable catalyst selected from the group which excludes sodium oxide and potassium oxide, but includes all other metal oxides recommended by glass technologists for glass-making. The polymerization proceeds in part by a chain reaction of hydrogen ion transfer, particularly in the more alkaline aqueous solutions and is, further, catalyzed by the metal ions, which fit within the linear polymer in such a manner that the polysilicate fibrils partake of the nature of colloidally dispersed glass.

The method of polymerization can be described generally as involving the following steps. The starting solution is an aqueous solution of the silicate of an alkali metal of the group consisting of sodium, potassium, and mixtures thereof in which solution the ratio of oxygen-containing compounds of the alkali metals to the oxygen-containing compounds of silicon is within the range from 1:2 to 1:5. This aqueous solution of alkaline silicate is then modified to prepare a mixture by incorporating catalytic amounts of at least one oxygen-containing compound of the group consisting of boron, aluminum, zirconium, titanium, zinc, calcium, barium, arsenic, germanium, hafnium, phosphorus, vanadium, antimony, lead, thorium, beryllium and tungsten. Heat is applied to this mixture to cause water to evaporate from the surface thereof so as to concentrate the mixture. During this heating or concentrating step that portion of the body of the mixture closest to where the heat is applied is spaced somewhat from the surface of the mixture at which the evaporation takes place and maintained at a temperature significantly higher than said surface so that a film of heated mixture will thereby diffuse through the balance of the mixture toward the evaporative surface. The pH of the body of the mixture is maintained above 7 during this heating of the mixture, and the heating is continued until at least 10% of the initial water content of the mixture has been removed and until the solids content of the remaining composition has become at least 40% by weight. At this stage of the process the alkaline silicates in the mixture will have polymerized during the concentration of the aqueous system. This polymerization is predominantly linear by reason of the catalytic influence of the oxygen-containing modifiers, and consequently predominant amounts of amorphous, glass-like, non-crystalline fibrils are formed as solids in the aqueous system, and these solids have an average molecular weight, as measured by the light scattering method, of at least 10,000.

There are various specific modifications of this general method for polymerizing silicate, and the relative effectiveness of these various techniques is indicated in Table 3 below.

TABLE 3

| Solids content of aqueous system | Treatment | Turbidity mol. wt. | (Z) dissymmetry |
|---|---|---|---|
| $Na_2O.SiO_2(1:3.4)$ | Refluxing for 12 hrs. with stirring; followed by rapid concentration in an open vessel ($CO_2$ present with stirring in air) to 45% solids. | 6,000-8,000 | 1.3 |
| $Na_2O.SiO_2(1:3.4)$ | Reflux 12 hrs.; concentrate in vacuum to 45% solids. | <3,000 | 1.1 |
| $Na_2O.SiO_2(1:3.4)$, 5% colloidal silica. | Reflux 12 hrs. with stirring; and heat in open vessel rapidly with stirring. Concentration to 45% solids. | 6,000-8,000 | 1.35 |
| $Na_2O.SiO_2(1:3.4)$, 5% colloidal silica 3% $H_3BO_2$. | ----do---- | 18,000-30,000 | 1.6 |
| $Na_2O.SiO_2(1:3.4)$, 5% colloidal silica, 3% $H_3BO_3$, 2% $Al_2O_3$, 2% ZnO, 1% MgO. | ----do---- | 130,000 | 3.0 |
| $Na_2O.SiO_2(1:3.4)$, 3% $H_3BO_3$, 3% $Al_2O_3$, 2% MgO. | ----do---- | 50,000 | 1.9 |
| $Na_2O.SiO_2(1:3.4)$, 3% $H_3BO_3$, 3% $Al_2O_3$, 2% MgO, 5% colloidal silica. | ----do---- | 100,000 | 2.8 |

In the above table the sodium silicate is a 34° Bé. solution, and the colloidal silica solution is a 30% solution. The data of Table 3 show: that the presence of air aids the attainment of higher molecular weights; that the presence of 5% boric acid (solids basis) catalyst can bring about a fivefold increase in the average molecular weight; that a multi-component catalyst helps to attain still higher molecular weights; and that the colloidal silica, although almost without effect by itself, promotes the activity of the multi-component catalyst; and that the higher molecular weight fibrils thus prepared have dissymmetry values establishing the linearity of the silicate molecules.

Although the data from light scattering studies provide the most persuasive evidence that linear polysilicates are formed in accordance with the present invention, a variety of other tests provide convincing confirmation of the result.

The intrinsic viscosity of a solution of sodium silicates is known to remain constant and independent of the velocity gradient. The aqueous solutions of linear polysilicates of the present invention exhibit an enormous dependence on velocity gradient.

By a method employing velocity radient dependence, employing various pressures and velocities and observing time of flow through standard capillary viscometers and calculating back to zero rate of shear, the values of Table 4 were obtained for intrinsic viscosity (N) in standard units.

TABLE 4

| Sample | Turbidity molecular weights | Intrinsic viscosity |
|---|---|---|
| 1 | 10,000 | 0.08 |
| 2 | 33,000 | 0.23 |
| 3 | 100,000 | 0.57 |
| 4 | 350,000 | 1.05 |
| 5 | 800,000 | 1.85 |

The solutions studied under a polarizing microscope and forced flow through a capillary exhibited flow birefringence similar to fine sodium bentonite suspensions.

All such data confirm the existence of linear (as distinguished from globular) polysilicate particles in the aqueous systems of the present invention.

EXAMPLE 1

Several manufacturers market aqueous solutions consisting essentially of water and colloidal silica in a concentration of about 30%. Any of the several brands of such solutions, which are sometimes briefly designated as 30% colloidal solutions, may be employed as the ingredient first used in preparing a paste having a catalytic effectiveness similar to the catalysts described in the fifth and seventh procedures of Table 3. A solution containing 30% colloidal silica was employed and the amount of boria expressed as boric acid was slightly more than half the amount of the silica. To 360 g. of the 30% silica solution, 37 g. of boria were added gradually with stirring, thus forming an aqueous system containing both silica and boria. Possibly the boria was in part absorbed on the surface of the colloidal silica particles. Possibly the system included both dissolved and absorbed boria. To the silica boria mixture, 174 g. of alumina were added gradually with stirring, and 21 g. of zinc oxide were introduced. In this manner 592 g. of a paste of uniform consistency was prepared containing 108 g. of colloidal silica, 37 g. of boria, 174 g. of alumina, 21 g. of zinc oxide (340 g. of solids) and 252 g. of water. In preparing such a paste, the metal oxides such as alumina and zinc oxide are in finely divided form and may be in the anhydrous, partially hydrated, or fully hydrated form inasmuch as the hydrated finely divided silica makes it possible to mix a uniform catalytic paste with any of such starting materials.

In a separate container, there was measured a sodium trisilicate solution which contained 3.22 parts of silica per part of sodium oxide, or about 8.5% sodium oxide, about 27.5% silica, and about 64% water, and a density designated as 38° Bé. (1.36 g./ml.). Some commercially available sodium trisilicate solutions corresponded exactly to such specifications, but some samples contained 65% water (35% solids) instead of 64% water, and some samples contained significant amounts of contaminants such as calcium oxide and aluminum oxide. Difficulties with such impurities can be avoided by employing a freshly prepared sample of sodium trisilicate resulting from the dispersion of fresh gelatinous silica in aqueous sodium hydroxide or by dispersing purified granular sodium trisilicate in deionized water.

The sodium trisilicate solution was heated during about 3 hours to evaporate water from the solution, and to increase the solids content from about 35% to above 40%. Thus, 750 g. of such concentrated silicate was prepared. In concentrating the solution, colloidal silicate was formed and dispersed within the concentrated sodium silicate solution.

The 592 g. of paste of boria, alumina, zinc oxide, colloidal silica and water was stirred into 750 g. of said concentrated sodium silicate to form 1342 g. of a composition, which was thoroughly mixed into 1500 g. of a liquid consisting of 900 g. of a 35% solution of a sodium trisilicate (3.22 ratio) and 600 g. of a 17.4% solution of pure sodium metasilicate (1.0 ratio). The 2842 grams of mixture were heated to evaporate sufficient water to concentrate the solution to a solids content of 40% to prepare a viscous liquid designated as a drawing composition. The mixture remains alkaline, i.e. at a pH above 7, during this concentration thereof. Data relating to this composition are set forth in Table 5.

TABLE 5

| | $H_2O$ | $Na_2O$ | $SiO_2$ | $B_2O_3$ | ZnO | $Al_2O_3$ | Total |
|---|---|---|---|---|---|---|---|
| Colloidal silica | 252 | | 108 | | | | 360 |
| Additives | | | | 37 | 21 | 174 | 232 |
| Concentrated silicate | 450 | 71 | 229 | | | | 750 |
| Trisilicate | 585 | 74 | 241 | | | | 900 |
| Metasilicate | 496 | 52 | 52 | | | | 600 |
| Before concentration | 1,783 | 197 | 630 | 37 | 21 | 174 | 2,842 |
| After concentration | 1,588 | 197 | 630 | 37 | 21 | 174 | 2,647 |
| Percent wet | 60 | 7.4 | 23.8 | 1.5 | 0.8 | 6.6 | |

By way of example, the "additives" of Example 1, as tabulated in Table 5 may be replaced by the following combinations (groups) with appropriate changes in other components to make up a 100% composition:

(Parts by weight)

(a) $Al_2O_3$ 160, CaO 15, $B_2O_3$ 25, ZnO 5
(b) $Al_2O_3$ 200, $P_2O_5$ 30
(c) $ZrO_2$ 80, CaO 10, ZnO 5, $B_2O_3$ 30
(d) $TiO_2$ 100, $Al_2O_3$ 100, MgO 25, $Al_2O_3$ 10
(e) $PbO_2$ 30, $ZrO_2$ 50, CoO 15, $MoO_3$ 10
(f) $SnO_2$ 100, FeO 20, $As_2O_5$ 15
(g) $Al_2O_3$ 200, BaO 20, $B_2O_3$ 20
(h) $Al_2O_3$ 100, SrO 10, BeO 5, CoO 5, $Fe_2O_3$ 5
(i) $TiO_2$ 50, $WO_3$ 15
(j) $Al_2O_3$ 80, CoO 5, NiO 5, FeO 5, $Fe_2O_3$ 5, $P_2O_5$ 10
(k) $B_2O_3$ 27, ZnO 21, $Al_2O_3$ 174

Other examples are possible, provided the proportions are in the ranges stated to be admissible.

The viscous liquid resulting from the polymerization of the silicate can be used for any purpose for which aqueous dispersals of linear polysilicate fibril-type colloidal particles are useful such as in the protective coating, adhesive, and/or other industrial arts employing sodium silicate.

It should be noted that the combination of metallic anion such as borate with a metallic cation such as aluminum is particularly effective for catalyzing the linear polymerization. The polymerization is brought about by heating one portion of the alkaline silicate solution while evaporating water from a surface thereof.

During such concentration of the solution, the dehydration of the silicate aggregates to form larger aggregates occurs predominantly in a portion of the liquid near the surface of evaporation. This is accomplished by maintaining that portion of the body of the liquid at which heat is applied at a distance from and at a significantly higher temperature than the temperature of the surface of water removal, and thus a film of heated liquid can diffuse through the balance of the liquid toward the evaporative surface to form such larger aggregates. Such polymerization occurs linearly instead of globularly because of the catalytic effect of the hydroxyl ions, the sodium ions, the borate ions, the aluminum ions, and particularly the combination of all of the catalytic components.

EXAMPLE 2

In the preparation of the solution as described in the above Example 1 and following the same procedure and operating technique, there may be prepared solutions having the same final compositions, with the variation within wide limits of the relative quantities of colloidal silica, concentrated and diluted trisilicate, metasilicate.

Generally speaking it is possible to employ in the preparation of the aqueous dispersions the following quantities of the various ingredients:

30% colloidal silica: from 0% to 100% of the silica contained in the system;
40% conc. trisilicate: from 0% to 100% of the total silica;
35% trisilicate: from 0% to 100% of the total silica;
17% metasilicate: the amount needed to make the final dispersion have the desired $SiO_2:Na_2O$ ratio between 2 and 5;
50% soda: the amount needed to make the final dispersion have the desired $SiO_2:Na_2O$ ratio between 2 and 5.

The addition of soda is carried out under stirring as the last operation of the aqueous dispersion before evaporating.

$H_2O$: The amount needed to make the dispersion have a solids content not higher than 37%, before evaporation.

The addition of water is effected initially during the mixing of the additives.

In the following table (Table 6) are illustrated by some numerical examples, the possibilities of varying the proportions (in parts by weight) of the individual components in the preparation of the dispersions, always operating with the technique described in Example 1. The quantities indicated are intended as quantities added in the various stages prior to evaporating. Said examples are indicative. Other formulations falling under the ranges stated above can be employed.

TABLE 6

|  | Dispersions | | | |
|---|---|---|---|---|
|  | I | II | III | IV |
| Colloidal silica | 500 | 1,000 | 2,100 | ------ |
| Additives | 232 | 232 | 232 | 232 |
| $H_2O$ | ------ | ------ | ------ | ------ |
| Concentrated silicate | 1,350 | 400 | ------ | ------ |
| Trisilicate | ------ | 300 | ------ | 2,360 |
| Metasilicate | 820 | 1,760 | ------ | ------ |
| 40% soda | ------ | ------ | 520 | ------ |
| Total | 2,902 | 3,692 | 2,832 | 2,842 |

The dispersions I, II, III, IV tabulated, as prepared by the method of Example 1, should be successively evaporated in the warm state until the final weight of 40% min. solids is achieved so as to correspond to the final composition of the dispersion of Example 1, namely:

| | Percent | | Percent |
|---|---|---|---|
| $H_2O$ | 60 | $BiO_3$ | 1.5 |
| $Na_2O$ | 7.4 | ZnO | 0.8 |
| $SiO_2$ | 23.8 | $Al_2O_3$ | 6.5 |

EXAMPLE 3

For the preparation of the solution of Example 3, the same operative conditions of Example 1 are followed, but the quantities added of colloidal silica and of alkali silicates are conveniently varied in such a way that the ratio $SiO_2:Na_2O$ is varied, but always between 2 and 5.

In Tables 7 and 8 are indicated some compositions suitable for the latter purpose.

TABLE 7

|  | $H_2O$ | $Na_2O$ | $SiO_2$ | $B_2O_3$ | ZnO | $Al_2O_3$ | Total |
|---|---|---|---|---|---|---|---|
| Colloidal silica | 420 | ------ | 180 | ------ | ------ | ------ | 600 |
| Additives | ------ | ------ | ------ | 37 | 21 | 174 | 232 |
| Conc. silicate | 120 | 19 | 61 | ------ | ------ | ------ | 200 |
| Trisilicate | 260 | 30 | 100 | ------ | ------ | ------ | 390 |
| Metasilicate | 1,910 | 195 | 195 | ------ | ------ | ------ | 2,300 |
| Total before concentrating | 2,710 | 244 | 536 | 37 | 21 | 174 | 3,722 |
| Total after concentrating | 1,518 | 244 | 536 | 37 | 21 | 174 | 2,530 |
| Percent by weight | 60 | 9.7 | 21.3 | 1.5 | 0.8 | 6.7 | ------ |
| $SiO_2$ to $Na_2O$ ratio | ------ | 2.2 | ------ | ------ | ------ | ------ | ------ |

TABLE 8

|  | $H_2O$ | $Na_2O$ | $SiO_2$ | $B_2O_3$ | ZnO | $Al_2O_3$ | Total |
|---|---|---|---|---|---|---|---|
| Colloidal silica | 600 | ------ | 260 | ------ | ------ | ------ | 860 |
| Additives | ------ | ------ | ------ | 37 | 21 | 174 | 232 |
| $H_2O$ | 800 | ------ | ------ | ------ | ------ | ------ | 800 |
| Conc. silicate | ------ | ------ | ------ | ------ | ------ | ------ | ------ |
| Trisilicate | 1,600 | 200 | 640 | ------ | ------ | ------ | 2,440 |
| Metasilicate | ------ | ------ | ------ | ------ | ------ | ------ | ------ |
| Total before concentrating | 3,000 | 200 | 900 | 37 | 21 | 174 | 4,332 |
| Total after concentrating | 2,000 | 200 | 900 | 37 | 21 | 174 | 3,332 |
| Percent by weight | 60.0 | 6.0 | 27.0 | 1.1 | 0.6 | 5.3 | ------ |
| $SiO_2$ to $Na_2O$ ratio | 4.5 | ------ | ------ | ------ | ------ | ------ | ------ |

EXAMPLE 4

Operation is as in Example 1 but the sodium silicates are replaced wholly or partly by the corresponding silicates of potassium or of the other alkali metals of group I of the periodic classification of elements.

EXAMPLE 5

By operating under the same conditons of Example 1 it is possible to prepare other dispersions by varying the formulation of the additives added.

Besides the oxides ($Al_2O_3$, ZnO) and the anhydride ($B_2O_3$) cited in the preceding examples, it is possible to employ a considerable number of other additives.

Said additives or catalyst have the purpose of causing the linear polymerization of the silica in aqueous basic medium. Such additives are the non-alkaline compounds containing oxygen and are components in conventional compositions of glass as made by melting. They may be divided into three categories:

(1) catalysts basic in character (oxides);
(2) catalysts acid in character (anhydrides);
(3) catalysts amphoteric in character.

The catalytic action may be exerted by one single catalyst but generally it is preferred to utilize the contemporaneous action of a number of catalysts and in particular the combination of a catalyst having basic character, of one having acid character and of one having amphoteric character.

To the first category belong the oxides of groups II and VIII of the periodic system, such as those of Ca, Mg, Ba, Sr, Be, Co, Ni, Fe, etc.; these can be employed alone or in admixture with one another in such amounts as not to surpass the oxide to alkali oxide ratio=0.2.

To the second category belong the anhydrides of groups III, V and VI of the periodic system, such as: $B_2O_3$, $P_2O_5$, $WO_3$, $As_2O_3$, $As_2O_5$, $Sb_2O_5$, etc.: these can be employed alone or in admixture with one another in such proportions as not to exceed the anhydride to alkali oxide ratio=0.3. The latter may also be employed in the form of salts: $NaBO_3$, $H_3BO_3$ $Na_3AsO_4$; $K_2HPO_4$, $(NH_4)_2MoO_4$, etc.

To the third category belong the oxides of metals of groups III and IV such as $Al_2O_3$, $ZrO_2$, $TiO_2$, $PbO_2$, $SnO_2$, etc. Said oxides may be employed (each taken alone) in such proportions as to come within the following ranges of the oxide to alkali oxide ratio:

$Al_2O_3$:Alkali oxide ratio from 0 to 1.25;
$ZrO_2$:Alkali oxide ratio from 0 to 1.000;
$TiO_2$:Alkali oxide ratio from 0 to 0.70;
$PbO_2$:Alkali oxide ratio from 0 to 0.25;
$SnO_2$:Alkali oxide ratio from 0 to 0.25.

Hence for the preparation of aqueous dispersions many formulations can be employed which take into account the principles set forth hereinabove.

By way of examples of various additives, in the following table some formulations (in parts by weight) are indicated which may be substituted for the additives of Tables 5–6–7–8 of Examples 1–2–3.

TABLE 9
*Additives (parts by weight)*

| | | | | |
|---|---|---|---|---|
| 1 | $Al_2O_3$, 160 | CaO, 15 | BaO, 5 | $B_2O_3$, 25 |
| 2 | $Al_2O_3$, 250 | $NaBO_3$, 20 | | |
| 3 | $Al_2O_3$, 200 | $P_2O_5$, 30 | | |
| 4 | $ZrO_2$, 80 | CaO, 10 | ZnO, 5 | $B_2O_3$, 30. $As_2O_3$, 10. |
| 5 | $Ti_2O$, 100 | $Al_2O_3$, 100 | MgO, 25 | |
| 6 | $PbO_2$, 30 | $ZrO_2$, 50 | CoO, 15 | $MoO_3$, 15. |
| 7 | $SnO_2$, 100 | FeO, 20 | $As_2O_5$, 15 | |
| 8 | $Al_2O_3$, 200 | BaO, 20 | $B_2O_3$, 20 | |
| 9 | $Al_2O_3$, 100 | SrO, 10 | BaO, 5 | CoO, 5. |

It is thus evident that a considerable number of possibilities can derive from the combination of the various oxygenated compounds above mentioned, in the preparation of the aqueous dispersions.

It should be noted that the sum of the non-alkaline oxygenated compounds should be such as to be kept within the limits of the 0.1 to 2 range of the non-alkaline oxygenated compound to alkali oxide ratio.

To summarize, the invention includes:

The preparation of an alkaline aqueous system containing silicates according to Example 1;

The preparation of aqueous dispersions having a $SiO_2$ to alkali oxide ratio of from 2 to 5 and containing a catalyst as above defined;

The preparation of aqueous dispersions of alkali silicates containing non-alkaline oxygenated derivatives known per se to be components in conventional glasses and acting as catalysts for the formation of silicates having prevailingly linear character.

As above stated, said components may belong to 3 classes:

Oxides of groups II and VIII of the periodic chart;
Oxides of groups III and IV of the periodic chart;
Anhydrides of groups III and V of the periodic chart;

and these can be employed in the ranges defined in Example 5.

In the manufacture of glass from fused siliceous systems, data has been accumulated relating to the relative attractiveness of various metal oxides as components for soda glasses. By a series of tests, it is established that the relative attractiveness of metal oxides as catalysts for linear polysilicates is approximately the same as the order of attractiveness of metal oxides as components for soda glasses. Thus boria and alumina (especially combinations thereof) are superior to tungstia. In the oxide-containing paste of the present invention, one or more of such various metal oxides, commonly known as "glass-forming oxides" or "halogenic" compounds, may be employed. The preferred glass-forming oxides are those selected from the group consisting of oxygen-containing compounds of the group consisting of compounds of boron, aluminum, zirconium, titanium, zinc, calcium, barium, arsenic, germanium, hafnium, phosphorus, vanadium, antimony, lead, thorium, beryllium, and tungsten.

Obviously various modifications of the illustrative examples are possible without departing from the full scope of the invention as defined in the appended claims.

I claim:

1. The method of polymerizing alkaline silicates in an aqueous system to form an aqueous dispersion of linear polysilicate fibrils which includes the steps of evaporating water from an aqueous silicate solution to concentrate it and to form colloidal silicate dispersed therein, said aqueous silicate solution containing the silicate of at least one alkali metal of group I of the periodic classification of elements, the ratio of alkali metal oxides in said aqueous silicate solution to the silica therein being within the range from 1:2 to 1:5, modifying the concentrated aqueous silicate solution by incorporating therein a catalytic paste prepared by adding to an aqueous solution of approximately 30% colloidal silica an amount of at least one additive sufficient to catalyze the linear polymerization of said alkaline silicate, said additive being selected from the three groups consisting of: first, an oxide of the elements calcium, magnesium, barium, strontium, beryllium, cobalt, nickel and iron in such amounts as not to surpass an oxide to alkali oxide ratio of about 0.2; second, a compound selected from the group $P_2O_5$, $WO_3$, $As_2O_5$, $Sb_2O_5$, $Na_3AsO_4$, $K_2HPO_4$, $(NH_4)_2MoO_4$, in such proportions as not to exceed the ratio of the anhydride equivalent of said compound to alkali oxide of about 0.3; third, an oxide of the metals aluminum, zirconium, titanium, lead, germanium, tin, hafnium, vanadium and thorium in such proportion as not to exceed the values of 0.25, 0.25, 0.70, 1.00 and 1.25 respectively for $SnO_2$, $PbO_2$, $TiO_2$, $ZrO_2$ and $Al_2O_3$; the sum of the non-alkaline oxygenated compounds in said additive being within the range necessary to make the ratio of said sum to alkali oxide within the range of 0.1 to 2.0; thereafter applying heat to a body of the mixture of concentrated silicate solution and catalytic paste to evaporate water from the surface thereof and to form aggregates of material therein, maintaining said mixture at alkaline conditions above pH 7 during the evaporation of water from the mixture, continuing the heating of said body of mixture until the water evaporated therefrom is at least 10% of the initial water content and until the solids content of the remaining composition is increased to at least 40% by weight, whereby the alkaline silicate molecules polymerize under the influence of said catalytic paste and incorporate the oxygen-containing compounds of said paste in the polymer to form a predominant amount of amorphous glass-like non-crystalline fibrils.

2. A composition prepared in accordance with claim 1, and consisting of water containing at least 40% high molecular weight, predominantly over 10,000 molecular weight, linear, amorphous, non-crystalline, glass-like alkaline silicate fibrils having the modifying content of said additive.

References Cited in the file of this patent
UNITED STATES PATENTS

| | | |
|---|---|---|
| 2,886,404 | Teja | May 12, 1959 |
| 2,919,996 | Teja | Jan. 5, 1960 |